(12) United States Patent
Halpern

(10) Patent No.: US 8,778,429 B2
(45) Date of Patent: Jul. 15, 2014

(54) METHOD FOR PREPARING EGG PRODUCTS IN A MICROWAVE OVEN

(75) Inventor: Brad M. Halpern, Westlake Village, CA (US)

(73) Assignee: Eggology, Inc., Canoga Park, CA (US)

( * ) Notice: Subject to any disclaimer, the term of this patent is extended or adjusted under 35 U.S.C. 154(b) by 0 days.

(21) Appl. No.: 13/326,281

(22) Filed: Dec. 14, 2011

(65) Prior Publication Data

US 2012/0288593 A1 Nov. 15, 2012

Related U.S. Application Data

(63) Continuation of application No. 11/073,817, filed on Mar. 7, 2005, now Pat. No. 8,101,219.

(60) Provisional application No. 60/550,361, filed on Mar. 5, 2004.

(51) Int. Cl.
*A23L 1/32* (2006.01)

(52) U.S. Cl.
USPC ........... 426/394; 426/107; 426/614; 426/111; 426/113; 426/115; 426/118; 426/120; 426/407; 426/445; 426/395; 426/396

(58) Field of Classification Search
USPC ......... 426/107, 614, 111, 113, 115, 120, 394, 426/407, 445, 118, 395, 396
See application file for complete search history.

(56) References Cited

U.S. PATENT DOCUMENTS

| | | |
|---|---|---|
| 2,525,096 A | 10/1950 | Damuth |
| 2,660,530 A | 11/1953 | Adams |
| 2,858,224 A | 10/1958 | Darrah |
| 3,285,749 A | 11/1966 | Shires |
| 3,385,712 A | 5/1968 | Dodge et al. |
| 3,394,388 A | 7/1968 | Kuchlin |
| 3,506,459 A | 4/1970 | Parlour |
| 3,565,638 A | 2/1971 | Ziegler et al. |
| 3,615,716 A | 10/1971 | Poulos |
| 3,734,749 A | 5/1973 | Bridgford |

(Continued)

FOREIGN PATENT DOCUMENTS

| | | |
|---|---|---|
| FR | 2 642 050 | 7/1990 |
| GB | 2 114 422 | 8/1983 |

(Continued)

OTHER PUBLICATIONS

Food Institute Report, Mar. 31, 1984, p. 4 (Dialog 83086, Item 13, File 79).

(Continued)

*Primary Examiner* — Anthony Weier
(74) *Attorney, Agent, or Firm* — Christie, Parker & Hale, LLP

(57) ABSTRACT

An apparatus and method is shown for preparing liquid egg products, for example pure egg whites, whole eggs and egg products either alone or mixed with spices, vegetables or other ingredients, in a microwave oven. The container for preparing the liquid egg products is relatively inexpensive and disposable. In another embodiment of the present invention, a method is provided for preparing liquid egg products in a disposable, microwavable container in which the liquid egg product expands while cooking and partially removes the lid of the container to create a delicious meal of properly cooked, fresh egg product, that are ready for consumption.

10 Claims, 3 Drawing Sheets

(56) References Cited

U.S. PATENT DOCUMENTS

| | | | |
|---|---|---|---|
| 3,831,508 A | 8/1974 | Wallard | |
| 3,851,571 A | 12/1974 | Nichols | |
| 3,997,677 A | 12/1976 | Hirsch et al. | |
| 4,013,798 A | 3/1977 | Goltsos | |
| 4,133,996 A | 1/1979 | Fread | |
| 4,397,874 A | 8/1983 | Piotrowski | |
| 4,525,367 A | 6/1985 | Allison | |
| 4,571,340 A | 2/1986 | Ferrante et al. | |
| 4,734,288 A | 3/1988 | Engstrom et al. | |
| 4,818,545 A | 4/1989 | Kunimoto | |
| 4,882,463 A | 11/1989 | Kyougoku et al. | |
| 4,910,036 A | 3/1990 | Rapp | |
| 4,959,231 A | 9/1990 | Lakey et al. | |
| 4,961,944 A | 10/1990 | Matoba et al. | |
| 4,986,438 A | 1/1991 | Borst | |
| 5,214,257 A | 5/1993 | Riskey | |
| 5,674,546 A | 10/1997 | Barnes et al. | |
| 5,958,482 A * | 9/1999 | Monforton | 426/107 |
| 5,989,608 A | 11/1999 | Mizuno | |
| 6,066,346 A * | 5/2000 | Hunt et al. | 426/107 |
| 6,126,976 A | 10/2000 | Hasse et al. | |
| 6,235,325 B1 | 5/2001 | Greitzer | |
| 6,306,448 B1 * | 10/2001 | Martuch et al. | 426/107 |
| 6,329,004 B1 | 12/2001 | Fernandez | |
| 6,410,073 B1 * | 6/2002 | McPherson et al. | 426/549 |
| 6,510,073 B1 * | 1/2003 | Lee et al. | 365/145 |
| 6,627,242 B1 * | 9/2003 | McPherson et al. | 426/549 |
| 6,660,983 B2 * | 12/2003 | Monforton et al. | 219/727 |
| 6,733,807 B2 * | 5/2004 | Martuch et al. | 426/107 |
| 6,868,980 B2 | 3/2005 | Schultz et al. | |
| 6,951,999 B2 * | 10/2005 | Monforton et al. | 219/727 |
| 8,101,219 B2 * | 1/2012 | Halpern | 426/107 |
| 2002/0020701 A1 | 2/2002 | Aubert | |
| 2003/0134030 A1 | 7/2003 | Merkle et al. | |
| 2003/0190398 A1 * | 10/2003 | Reuter et al. | 426/549 |
| 2004/0208970 A1 * | 10/2004 | Reuter et al. | 426/549 |

FOREIGN PATENT DOCUMENTS

| | | | |
|---|---|---|---|
| GB | 2 369 341 | | 5/2002 |
| JP | 62-098123 | | 5/1987 |
| JP | 62-098124 | | 5/1987 |
| JP | 01-199863 | | 8/1989 |
| JP | 1-291770 | * | 11/1989 |
| JP | 03-035759 | | 2/1991 |
| JP | 6-62803 | * | 3/1994 |
| JP | 07-039344 | | 2/1995 |
| JP | 7-147936 | * | 6/1995 |
| JP | 09-205977 | | 8/1997 |
| JP | 10-070967 | | 3/1998 |
| JP | 10-316177 | | 12/1998 |
| JP | 2000-210032 | | 8/2000 |
| JP | 2000-281149 | | 10/2000 |
| JP | 2000-333649 | | 12/2000 |
| JP | 2001-097436 | | 4/2001 |
| JP | 2003-235516 | | 8/2003 |

OTHER PUBLICATIONS

Food Industry Bulletin, vol. 14, No. 11, Jan. 1997, p. 7 (Dialog 2744481, Item 9, File 79).

Journal of Chinese Society of Animal Science, vol. 24, No. 2, 1995, pp. 215-227 (Dialog 00712352, Item 9, File 51).

* cited by examiner

METHOD FOR PREPARING EGG PRODUCTS IN A MICROWAVE OVEN

CROSS-REFERENCE TO RELATED APPLICATION

This application is a continuation of U.S. patent application Ser. No. 11/073,817, filed on Mar. 7, 2005, now U.S. Pat. No. 8,101,209, which claims the benefit of U.S. Provisional Application No. 60/550,361, filed on Mar. 5, 2004, the entire contents of which are incorporated herein by reference.

FIELD OF THE INVENTION

The present invention relates to food preparation, and more particularly, to an apparatus and method for preparing liquid egg products in a microwave oven.

BACKGROUND OF THE INVENTION

There exists a great demand for food products that may be quickly and conveniently prepared in a microwave oven or the like. A further convenience results where the product may be provided in a low cost disposable container, one from which the food product may be eaten and the container disposed. There are a number of foods that are microwaveable in disposable containers, but such foods have not extended to liquid egg products.

Liquid egg products may be placed in a separate microwavable container, but this adds an additional step in the food preparation process, and typically the containers are not disposable but are intended to be washed and reused. Also, the liquid egg products cook unevenly, are undercooked or overcooked. The conventional microwave container does not accommodate the expansion of the cooked eggs. Those skilled in the art would desire a product that easily and conveniently allows liquid egg products to be prepared in a disposable container.

SUMMARY OF THE INVENTION

There is therefore provided according to the present invention an apparatus and method for preparing liquid egg products, for example pure egg whites, whole eggs and egg products mixed with spices, vegetables or other ingredients, in a microwave oven. The container for preparing the liquid egg products is relatively inexpensive and disposable. In another embodiment of the present invention, a method is provided for preparing liquid egg products in a disposable, microwavable container in which the liquid egg product expands while cooking and partially removes the lid of the container to create a delicious meal of properly cooked, fresh egg product, that are ready for consumption. In a further embodiment, the liquid egg products may be in a container with a peel-off lid.

BRIEF DESCRIPTION OF THE DRAWINGS

These and other features of the present invention will be better understood via the following detailed description of the present invention read in conjunction with the attached figures, in which.

DETAILED DESCRIPTION OF THE INVENTION

Figure 1:
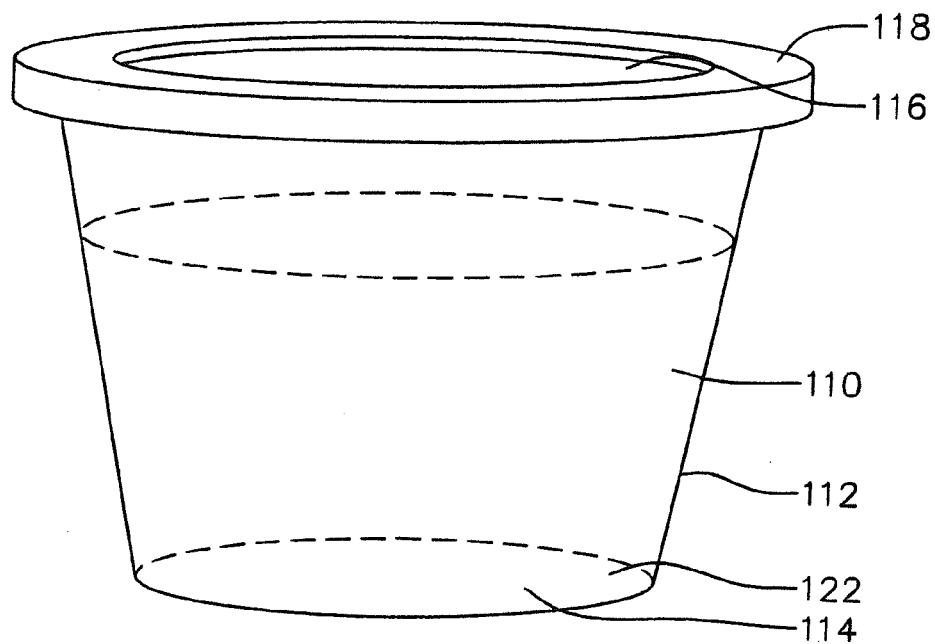
FIG. 1 is a diagram of an exemplary embodiment of a disposable container with a liquid egg product.

FIG. 1 is an exemplary embodiment of a disposable, microwavable container that contains a liquid egg product. As used herein, a liquid egg product may be pure liquid egg whites, pure liquid whole egg, pure liquid egg yolk, liquid egg whites, yolks or whole eggs mixed with additives including preservatives, additives that assist in cooking and similar additives, liquid egg whites, yolks or whole eggs mixed with vegetables, spices, meat, poultry, seafood or other types of ingredients or similar products. The liquid egg product may be an egg-like or artificial egg product.

In one embodiment, the container 110 may have any shape or size to provide the advantages of this invention. The shape may be square, round, rectangular, polygonal, irregular or similarly shaped. The walls of the container may be straight, curved or configured in any other pattern. The sides of the container may be roughly perpendicular to the base portion 114 or may slope inward or outward from the base portion 114 to the open top portion 116. The shape of the open top portion 116 may be any shape including ovoid, rectangular, square, irregular or any other shape.

The size of the container may be any size and define any interior volume. In the exemplary embodiment, the container 110 is a 6 ounce container. The size of the container may be changed to fit any amount of liquid egg product, fit any type of microwave or similar cooking apparatus or for any aesthetic or design considerations. In the exemplary embodiment, container 110 may have a generally ovoid footprint with walls 112 that expand outwardly from a base portion 114 to an open top portion 116. In another embodiment, the container may have a rectangular, polygonal, irregular or similarly shaped foot print.

In one embodiment, a detachable lid 118 may cover the top portion 116 of the container 110 to seal the contents of the container. The lid 118 may have any shape matching the top open portion 116 of the container. The container 110 and lid 118 may be composed of any microwaveable materials including microwaveable plastics, ceramics, glass, paper product or similar materials suitable for use in the microwave. In another embodiment, the container 110 may have a peel-off cover discussed below. In one embodiment, the container and lid material may be transparent to allow a consumer to view the condition of the contents as they are cooking. In another embodiment, the container and lid material may be opaque, translucent or similarly shaded or colored.

In one exemplary embodiment, suitable disposable containers are described in U.S. Pat. Nos. 6,056,138 and 6,196,404, the contents of which are hereby incorporated by reference. As described in the patents, the prevention of spoilage of the liquid egg product from bacteria such as salmonella is of paramount importance. In one exemplary embodiment, the container may be a triple sealed container that protects against such microorganisms. In the exemplary embodiment, the container may comprise a base portion 114 and a lid portion 118. The base consisting of a unitary component including a bottom portion attached to an upwardly extending perimeter wall, which may further be connected to a peripherally extending rim having an inner and outer edge.

In the exemplary embodiment, the lid 118 may also consist of a unitary component, with a downwardly extending wall 112, which is connected to a peripherally extending rim also having an inner and outer edge. The base edge and the lid edge may be correspondingly shaped to be mateable. The lid rim may also correspondingly shaped to engage the base rim. The contact of the edges and the rims form three main seals. The first seal is a result of the contact between the exterior edges of the base edge and the lid edge. The second seal is a result of contact between the interior edges of the base edge and the lid edge. The first and second seals are shaped to provide a self-reinforcing seal configuration wherein the initial engagement of the first or second seals initiates the third seal. The third seal is a result of the peripherally extending base and lid rims contacting each other leaving a seal surface area greater than the areas of said first or second seals. This third seal provides substantially more protection against spoilage and spilling, by dramatically decreasing the odds of foreign substances contacting food products, or food products leaking into contact with surfaces exterior to the container. In addition, the assembly may be stackable and same size nestable. In another embodiment, the lid portion 118 may be removably attached to the container 110 using any type of coupling mechanism including snap fit, form fit, latches and similar designs.

In the exemplary embodiment, the container 110 may have any size and contain any amount of liquid egg product. In one example, the container 110 may be a 6 ounce container filled with approximately 4 ounces of pure uncooked egg whites or similar composition containing egg whites or other liquid egg products. In another embodiment, the container may have any size capable of fitting into a standard microwave. The ratio of volume of the liquid egg products to the volume of the container may vary depending on the size and shape of the container. In one embodiment, the ratio of volume of liquid egg product to the volume of the container may be 2:3. In another embodiment, the ratio of the volume of the liquid egg product to the volume of the container may range from one half to three fourths. In one embodiment, the ratio of liquid egg product volume to container volume may be calculated to prevent spillage of liquid egg product during cooking. The liquid egg product may expand while cooking and a solid portion may breach the rim of the container, but no amount of liquid egg product will spill over the side of the container. Breaching the rim, as used herein, may indicate that the cooked egg product exceeds the height of the container or protrudes through the opening of the container.

Figure 2:
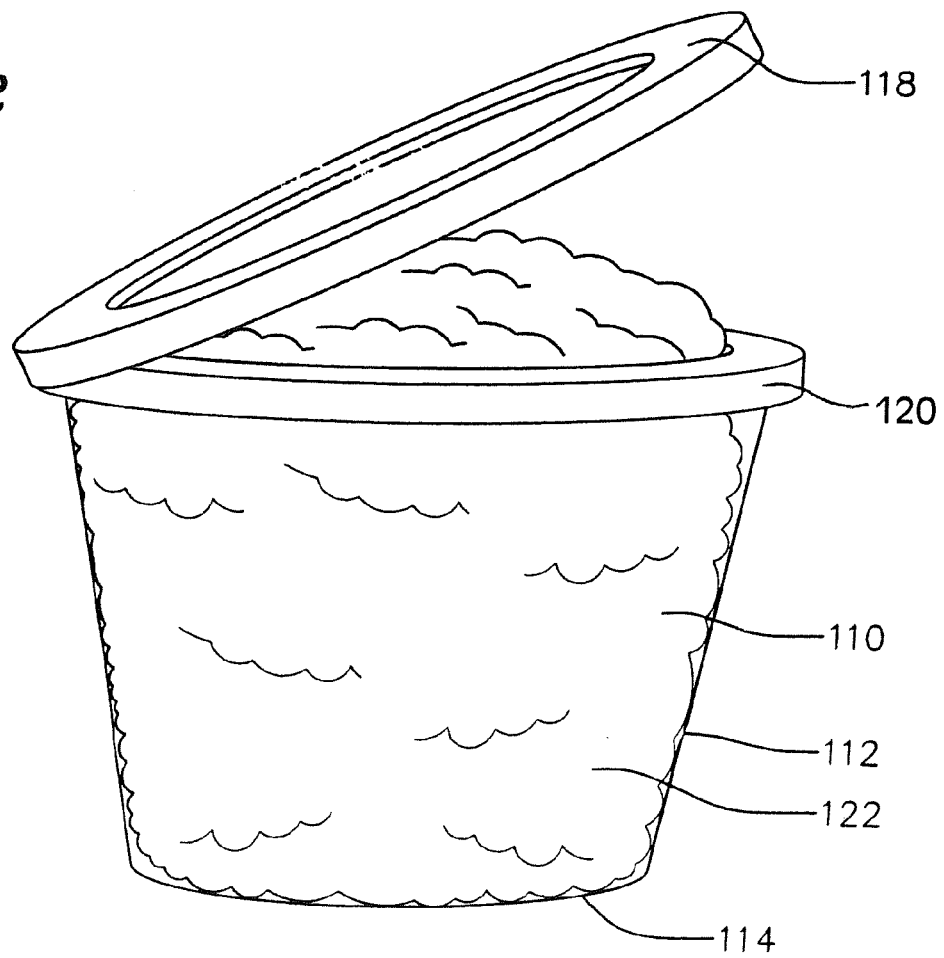
FIG. 2 is a diagram of the exemplary disposable container of a liquid egg product after cooking.

In one embodiment, the liquid egg product may be turned into a cooked meal by cooking the contents in a conventional microwave oven. The time of cooking may be dependent on the wattage, voltage and similar power factors as well as the size, technology, and manufacture of the microwave oven. The cooking time may also be dependent on the size or volume of the container and the liquid egg product. One of ordinary skill in the art would understand how these factors interrelate to determine the appropriate cooking time for the liquid egg product. In one example embodiment, a 6 ounce container of liquid egg product may cook for 90-100 seconds. During the cooking process, the liquid egg product 122 naturally expands within the container 110. As shown in FIG. 2, due to this expansion and the shape of the container, the liquid egg product 122 presses upon and opens a portion of the lid 118, allowing for easy removal of the lid and consumption of the cooked egg product directly from the container. In addition, opening the container during cooking may moderate the heat and pressure in the container allowing the liquid egg product to cook evenly and preventing them from over cooking by presenting a visual indicator to the consumer that the liquid egg product has sufficiently cooked and that the microwave may be stopped.

In one exemplary embodiment, the liquid egg product 122 may be pure fresh organic liquid egg whites or similar egg products that are pasteurized and tested for bacteria. Egg whites are beneficial because they contain no fat, cholesterol or trans fats. Egg whites also provide an excellent, natural source of protein that is readily absorbed in the human body, unlike fish, poultry and other products that must be broken down before the protein can be absorbed. Notwithstanding the foregoing, it is understood that other embodiments of the liquid egg product 122 may include egg whites with spices, vegetables or other ingredients, whole eggs including the egg yolk with spices, vegetables or other ingredients, other egg products, artificial egg like products with spices, vegetables or other ingredients or other compositions with similar properties to liquid egg products.

Figure 3:
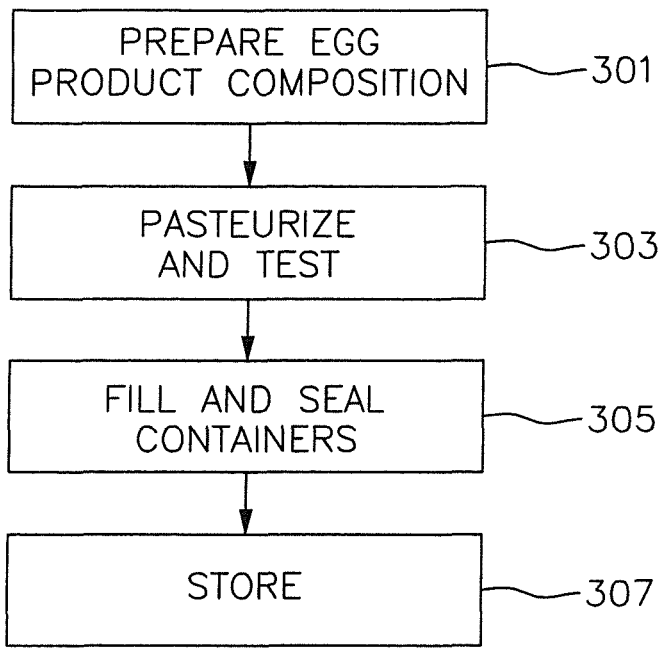
FIG. 3 is a flowchart of one embodiment of a process for manufacturing liquid egg products in disposable containers.

FIG. 3 is a flowchart of one embodiment of a process for producing the cooked egg product. In one exemplary embodiment, the liquid egg product may be obtained in any conventional manner (block 101). In one embodiment, the liquid egg product may be obtained by first thoroughly washing the outside of each egg prior to breaking. Second, the washed eggs may be loaded onto a quickly circulating stainless steel cup resembling a spoon or similar holder. As it moves, the eggshell may be struck and cracked, and each portion of the shell may be removed, leaving the yolk to fall to one side, and the white to the other. Any eggs that do not break perfectly may be discarded and not used for human consumption. In another embodiment, the egg white and yolk may be separated after removal from the shell. Any method of separating the egg white from the yolk may be used. In an embodiment where whole eggs may be used, then the entire contents of an egg may be utilized and not separated out after removal from the shell.

In one embodiment, after the contents of the egg have been collected they may be mixed with other ingredients such as meat, poultry, seafood, vegetables, spices, flavorants, colorants and similar food ingredients (block 303). In one embodiment, all the added ingredients may be natural ingredients. The ingredients may be combined by mixing, shredding, pureeing or similar food combination methods.

In one embodiment, the liquid egg product may be pasteurized and tested for safety (block 303). In another embodiment, the liquid egg product may be pasteurized and tested prior to mixing with other food ingredients. Testing may include testing for the levels of bacteria and similar organisms including salmonella. Testing may also include detecting particulate matter in the product.

In one embodiment, the liquid egg product may then be loaded into the containers in any suitable manner (block 305). The liquid egg product may be poured or similarly placed in the container. The lid of the container may then be placed on the container to enclose the liquid egg product in the container to protect it from microorganisms and other contaminants. As is conventional in the art, a further plastic removable seal or other packaging may be placed around the container to help prevent tampering. In a further embodiment, the liquid egg product may be placed in a container and sealed with a peel-off cover or similar top. The sealed container may then be stored (block 307). The container may be refrigerated or similarly stored.

Figure 4:
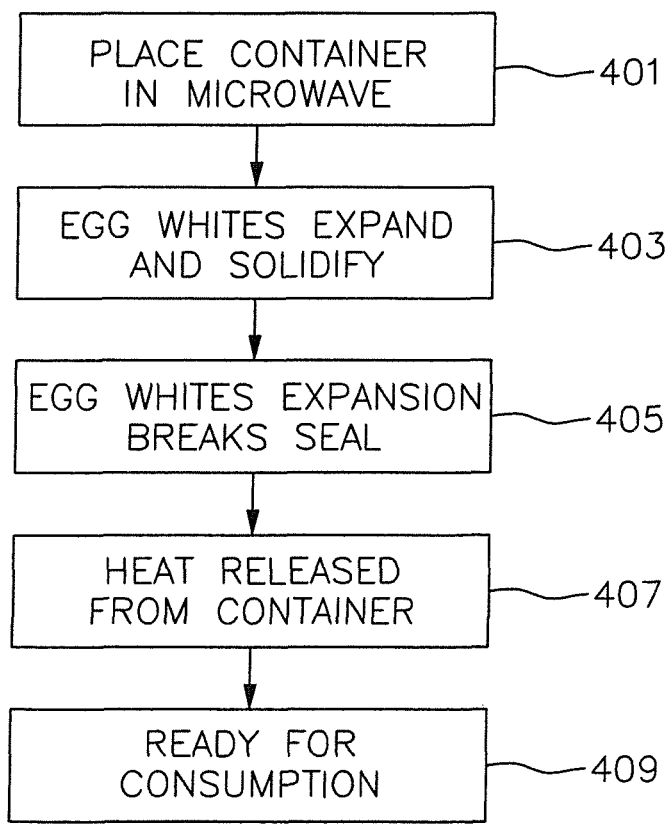
FIG. 4 is a flowchart of one embodiment of a process for cooking a liquid egg product.

FIG. 4 is a flow chart for one embodiment of the function of the packaged liquid egg product. The container may be placed by a consumer into a microwave oven (block 401). The microwave oven may have a rotating plate in the interior chamber or may have a standard interior surface. The container may be placed in any position in the interior chamber. The microwave may be set at a standard power level with a time setting dependent on the size, characteristics and power settings of the microwave. In one example, the microwave may be set to between 90 and 100 seconds for a six ounce container with four ounces of standard liquid egg product. The time may also vary proportionately to the size of the container and volume of liquid egg product.

If the microwave oven is activated, the liquid egg product begins to cook and solidify (block 403). As the liquid egg product begins to solidify it may expand upwardly in the container. The expanding liquid egg product may press against the inner surface of the lid. The seal or similar mechanism holding the lid in place has sufficient strength to resist the initial push of the composition but gives way as the composition nears completion in cooking (block 405). The lid may be partially opened, or completely opened. Opening the seal provides a visual and auditory signal to the consumer that the liquid egg product has fully cooked. The opening of the lid also releases steam and heat from the interior of the container that helped cook the liquid egg product, but threatens to overcook the composition after it has completely cooked (block 407). The visual and auditory indicator of completion helps to counteract the variance in cooking times required for different makes and models of microwaves. After a brief period of time the container may be removed from the microwave and its contents may be consumed (block 409). In an embodiment where an peel-off cover is used, the visual indicator may be the rising of the cooked egg product above the rim or the breaching of the rim of the container.

Figure 5A:
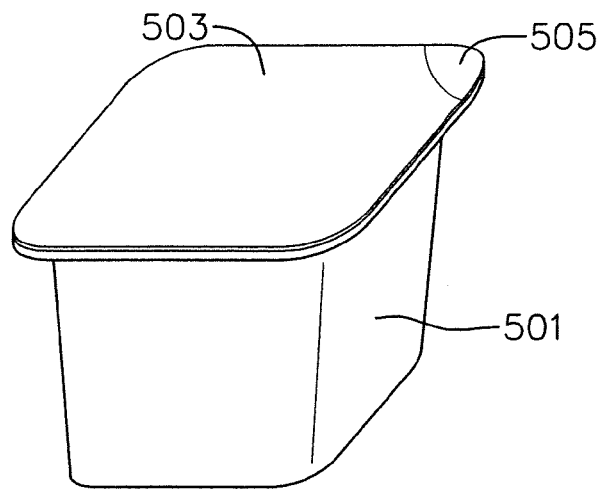
FIG. 5A is a diagram of one embodiment of a liquid egg product in a package with a peel-off cover.

FIG. 5A is a diagram of one embodiment of a container for a liquid egg product with a peel-off cover. In one embodiment, the container 501 may have the same size, shape and composition characteristics as the embodiments with detachable lids. The container 501 may have any size, shape or material composition suitable for use in a microwave. In one embodiment, the cover 503 may be composed of any flexible material suitable for being sealed to a container.

The cover 503 may be a plastic, paper based product, cellophane, foil or similar materials. The cover 503 may be affixed by wrapping around the upper open portion of the container or rim or by an adhesive or similar sealing material. The cover 503 may be affixed to the container 501 such that it is water tight, air tight or prevents tampering. In one embodiment, the cover 503 may have a tab 505 or similar protruding or graspable structure to allow a consumer to grip the cover 503 to remove the cover partially or completely from the container 501.

Figure 5B:
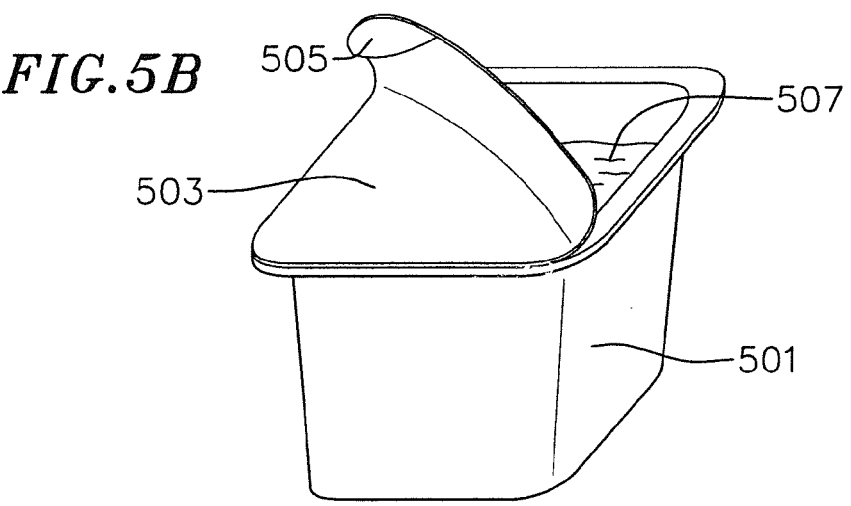
FIG. 5B is a diagram of one embodiment of a liquid egg product in a package with a peel-off cover where the package has been partially opened.

FIG. 5B is a diagram of the container of FIG. 5A where the peal-off cover has been partially removed. The cover 503 may be partially removed by peeling the cover 503 away from the container. This exposes the liquid egg product 507 stored within the container. The liquid egg product 507 may be stored within the container 501 in the same proportion as in other embodiments of the container. During cooking the liquid egg product 507 may expand beyond the rim or breach the rim of the container 501 without spilling over the side of the container. If the cover 503 has only been partially removed then the cooked egg product may further push the cover 503 open.

Figure 5C:
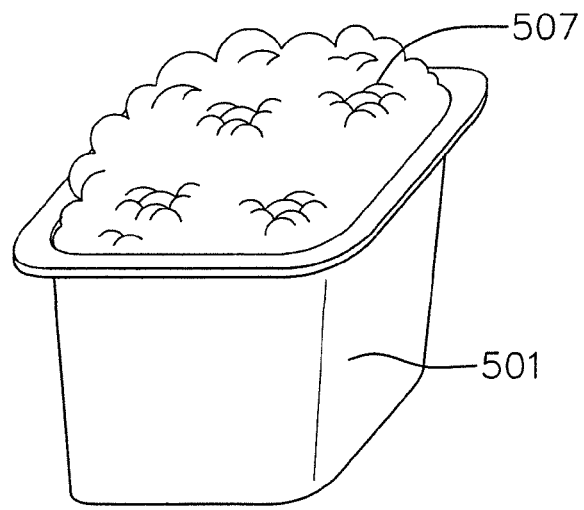
FIG. 5C is a diagram of one embodiment of a cooked egg product in the container of FIG. 5B.

FIG. 5C is a diagram of one embodiment of the container of FIG. 5A and FIG. 5B where the liquid egg product has cooked. When the liquid egg product 507 is cooked it may breach the rim of the container 501. The liquid egg product will not spill over the side of the container. This provides a convenient and clean container from which the cooked egg product may be eaten.

Those of ordinary skill in the art will readily understand that various modifications may be made to the described embodiment of the present invention without departing from the spirit and scope of the invention. By way of example, containers of different shapes and sizes and egg products of different types may be used, including spiced egg whites and egg whites with vegetables and other ingredients. While the present invention has been described in conjunction with egg whites, the present invention is not limited to such product, and may pertain to whole eggs and/or other egg products either alone or with other ingredients.

What is claimed is:

1. A method for preparing a liquid egg product comprising:
placing a container with an amount of the liquid egg product inside in a microwave oven; and
cooking the liquid egg product in the microwave oven for a specified cooking time,
wherein the amount of the liquid egg product relative to a volume of the container and the specified cooking time cause the liquid egg product to expand within the container and press against an inner surface of a container lid such that the container lid becomes partially dislodged from the container during cooking, and
wherein the container lid is readily removed from the container once the liquid egg product is cooked.

2. The method of claim 1, wherein the liquid egg product is an all egg white composition.

3. The method of claim 1, wherein the container lid becomes partially dislodged when the liquid egg product is completely cooked.

4. The method of claim 1, wherein the liquid egg product is mixed with at least one of meat, vegetables and spices.

5. The method of claim 1, wherein the specified time is 90 to 100 seconds.

6. The method of claim 1, wherein a ratio of a volume of the liquid egg product to the volume of the container is between one half and three fourths.

7. The method of claim 6, wherein the ratio is two to three.

8. The method of claim 1, further comprising:
adding the liquid egg product to the container.

9. The method of claim 1, further comprising:
pasteurizing the liquid egg product.

10. The method of claim 1, further comprising:
testing the liquid egg product for salmonella.

\* \* \* \* \*